Feb. 23, 1960 V. E. HART ET AL 2,926,292
WIRE DRAWING DIE BLOCK MOTOR CONTROL
Filed April 20, 1954 3 Sheets-Sheet 1
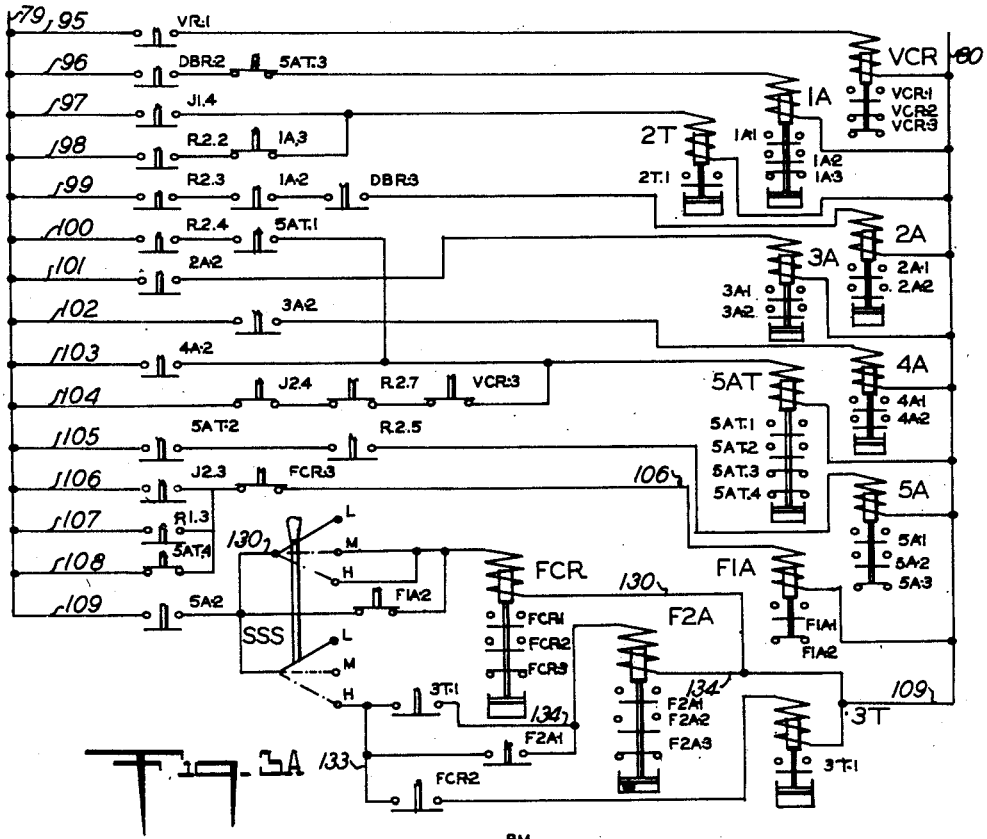
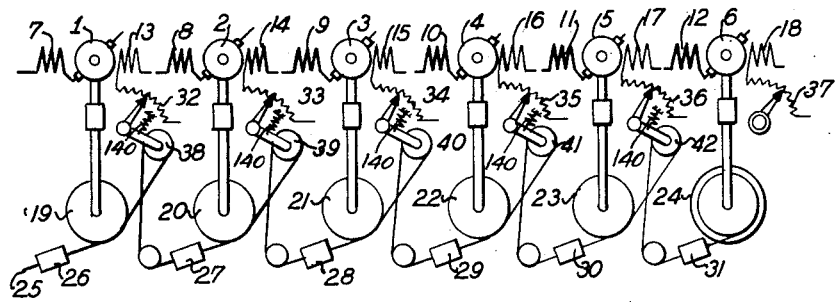
INVENTORS
VINCENT E HART
OMER D. WHITWELL
BY Harry P. Canfield
ATTORNEY

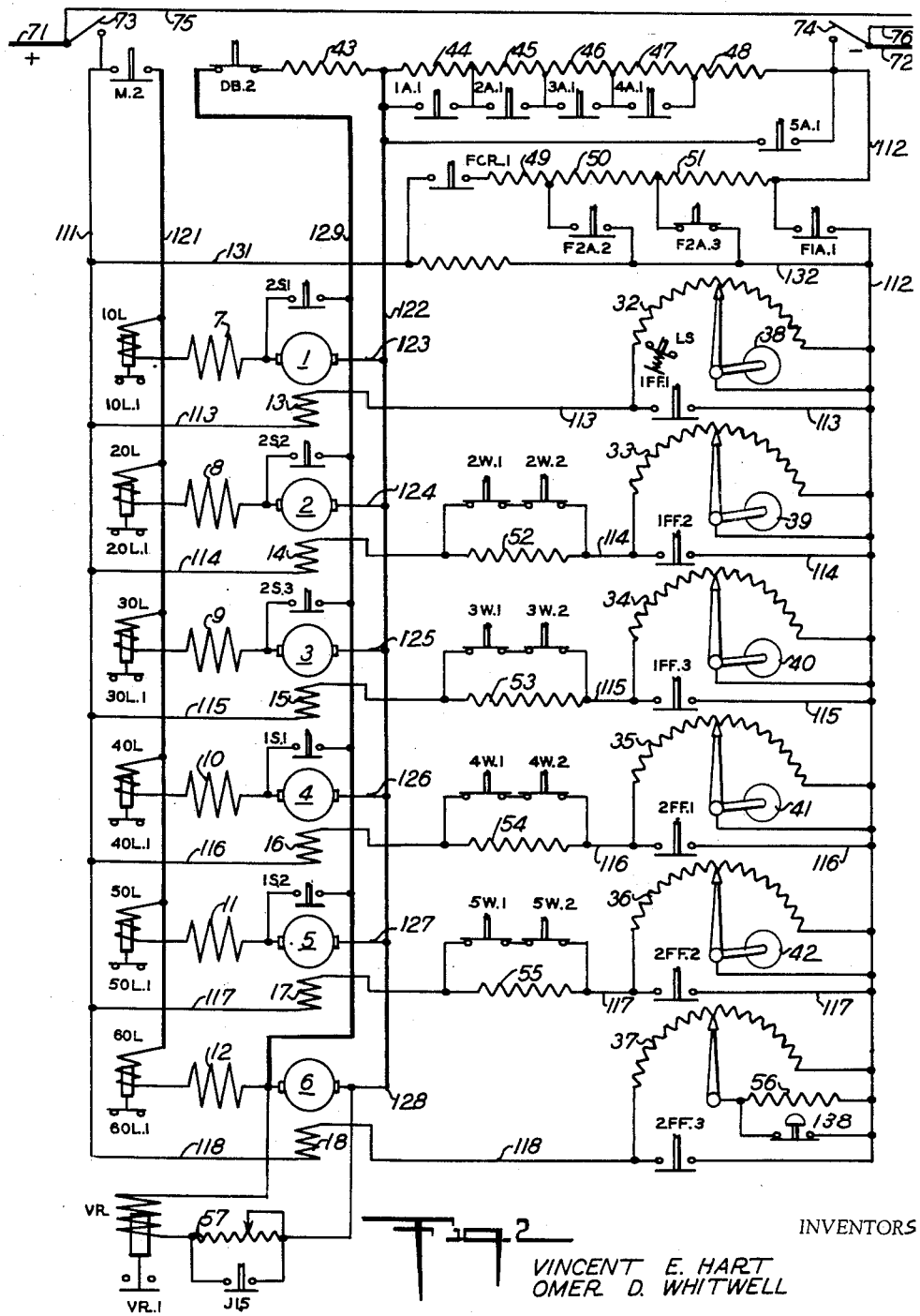

Feb. 23, 1960     V. E. HART ET AL     2,926,292
WIRE DRAWING DIE BLOCK MOTOR CONTROL
Filed April 20, 1954     3 Sheets-Sheet 3
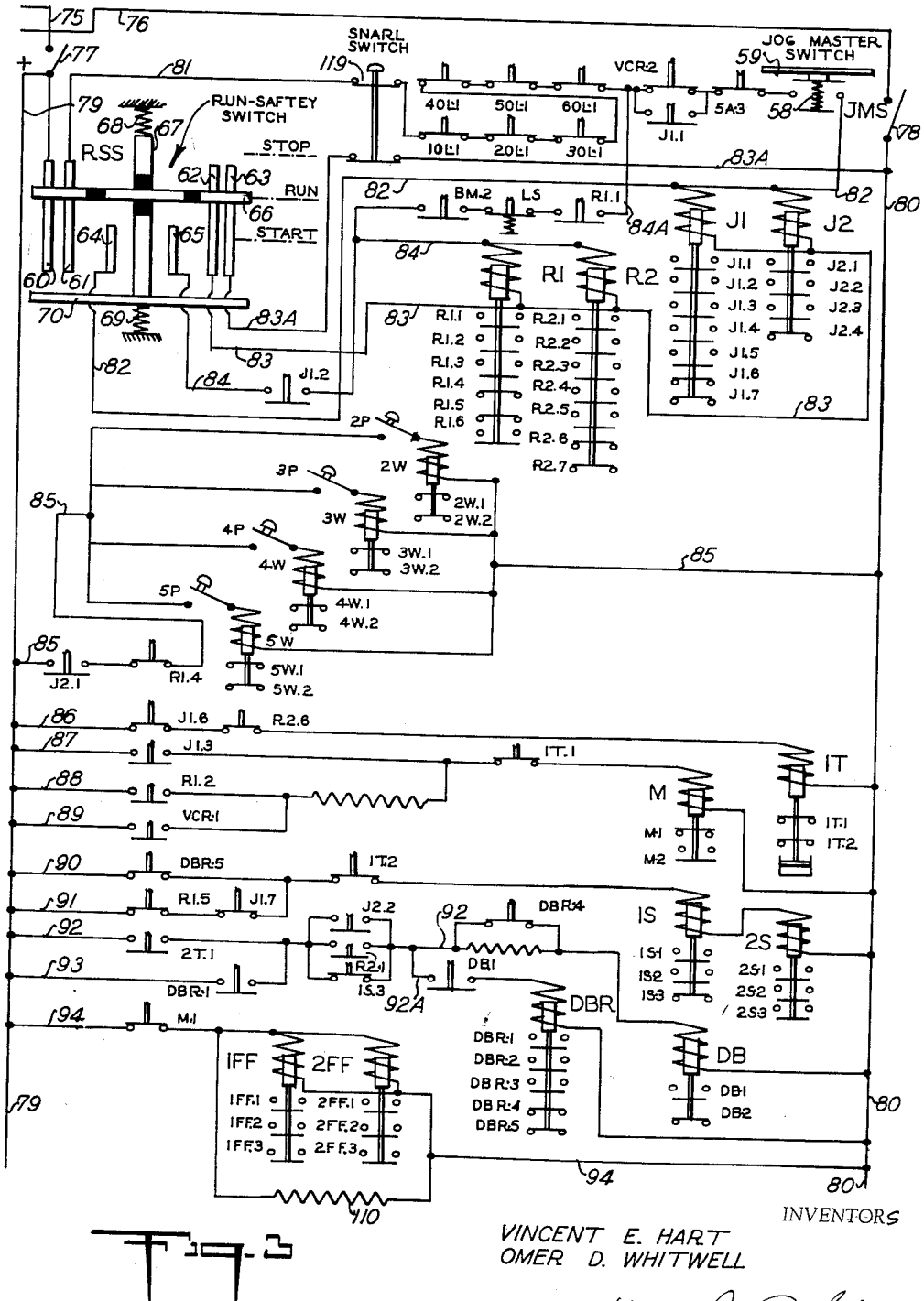
INVENTORS
VINCENT E. HART
OMER D. WHITWELL
BY
ATTORNEY

United States Patent Office 2,926,292
Patented Feb. 23, 1960

2,926,292

WIRE DRAWING DIE BLOCK MOTOR CONTROL

Vincent E. Hart and Omer D. Whitwell, Cleveland Heights, Ohio, assignors to The Clark Controller Company, Cleveland, Ohio, a corporation of Ohio Application April 20, 1954, Serial No. 424,446

4 Claims. (Cl. 318—7)

This invention relates to electric motor controls for controlling a plurality of motors concurrently; and has particularly useful application to the several motors of a multiple-die-block wire-drawing machine.

A motor control of this class constitutes the subject matter of the patent to Oswald M. Bundy 2,567,635, September 11, 1951, assigned to the assignee hereof, and the present invention may be considered as an improvement over that of the Bundy patent.

The main elements of an apparatus or machine suitable to incorporate the present invention is illustrated diagrammatically in Fig. 1 of the accompanying drawing.

A succession of motors indicated by their respective armatures 1 to 6; series fields 7 to 12; and shunt fields 13 to 18, drive respective capstans, 19 to 24, which pull the wire 25 through a succession of die blocks 26 to 31 of successively smaller drawing diameter; and wind or reel it on the last capstan 24.

The shunt fields 13 to 18, as shown, have field-strength-varying resistors 32 to 37, to vary the speeds of the motors independently of each other to prevent slack from accumulating in the wire between capstans; the resistor for the last motor being controlled by hand, and the resistors of the other motors being controlled by dancer rolls 38 to 42, over which the wire runs, and constrained by springs 140—140 to take up slack in the wire. The last capstan 24 will be driven at a chosen or controlled speed and the other capstans successively toward the left in Fig. 1 will run at successively lower driven speeds, in accordance with the increase of wire length as its diameter decreases. The motors will be driven all at the same speed except for variations by the rheostats, and the different speeds of the capstans will be obtained by transmission gears.

In order to operate a machine of this type at high speed, for efficiency, and at the same time reliably, and with safety to the operator, and with protection to the machine, the control system of this invention has been devised comprising improved features, among which are the following.

Whenever the system is connected to current supply means, there are circuits that are immediately automatically energized and apply the full line potential to the motor shunt fields as insurance that initial motor starting speed will be slow speed, and to thus "make ready" the system for operation.

The motors are preferably commercial, compound motors with shunt fields as usually provided, and if the operator should leave them fully energized across the line as referred to for an indefinite period without proceeding to operate the system and start up the machine, the fields might be overheated and damaged; but to have the advantages of full energization before starting they are so energized, and after an automatically timed period, some resistance is automatically inserted in series with them as a stand-by protection.

The control circuits of the system are interlocked so that in every instance of starting the machine, the operator is compelled to first start and operate it through a so-called "jogging" phase, bringing it up to a limited very low jogging speed; in some instances after intermittent starts and stops.

To this end he closes a Jog Switch and thereupon, automatically, main current is supplied to all of the motor armatures and series fields in parallel; and all in series with sections of armature accelerating resistance common to all of the motors; and loops are closed around each of the motor armatures individually through a resistor common to all of the loops; and if the said field protecting resistor had been put in series with the shunt fields, it is now cut out again giving them full line voltage, and full strength.

The motors thus start with maximum shunt fields; but with weak armature current due to the loops around the individual armatures.

Under these circumstances, the starting torque will be initially very small, and is provided for and utilized as a "take up" torque to gently take up any slack that may be present in the die-threaded wire, so that when sufficient torque is applied to begin to draw the wire through the dies there will be no sudden jerk on it with the liability of breaking it.

After a very short interval of time for slack "take up," the said loops around the armatures are opened, providing increased armature current, which, together with the series fields and full strength shunt fields, produces high "break away" torque on all of the motors, to start the wire through the dies; and the motors being to run at very low jogging speed.

After a short automatic time interval, the dancer roll rheostats are cut into the individual shunt field circuits, but otherwise they continue to be energized by full line potential.

A longer automatic time interval then elapses during which the machine comes up to steady operation at the very low jogging speed imposed by the strong fields; and at the end of the interval, a first section of the armature accelerating resistance is automatically cut out.

The machine is then operating at the maximum jogging motor speed but which is a very low speed; and the operation can be inspected to make sure it is normal; and if not it may be instantly stopped by dynamic braking; but if everything is normal, the running speed phase can be initiated, and the motors will be automatically accelerated up to a "low" running speed; and after this is effected, the running speed can be raised to an intermediate or "medium" speed, and then, after a timed interval, up to a maximum "high" speed. The running speed is selected manually by the operator on a three position speed selector switch, but the medium or high speeds cannot be obtained until after the low speed is fully operative.

Initiation of the low running speed is effected by the manual operation of a safety switch, having "start," "run" and "stop" positions, and in order to insure that starting must always first go through the very low jogging speed phase, this safety switch is rendered ineffective on the start position, unless the jog switch has been operated and at the time is maintained operated.

Then after manual operation of the safety switch to start position, the jog switch can be released and it will return to normal, and the safety switch can be released and will go automatically to "run" position. This cycle of manual operations of the jog and safety switches is prescribed by circuit connections and must be followed.

With the safety switch in run position, the motors remain under the conditions of maximum jogging speed, that is, the armatures and series fields of the several motors receive current from the line in parallel; the motor armature loops are open; one section of armature } accelerating resistance is cut out; and the shunt fields are energized across the line, but through the dancer roll rheostats.

The other sections of armature accelerating resistance are then automatically cut out at timed intervals, one after the other, to accelerate the motors up to the low running speed.

Upon cutting out the last section of accelerating resistance, the speed selector switch is automatically cut into the control, and may remain in low speed position; but if medium or high running speed is wanted it may be manually positioned accordingly.

A number of sections of "field accelerating resistance" are provided.

In the three speed positions, low, medium and high of the speed selector switch, the resistance sections are automatically grouped in different series or series-parallel arrangements. Each arrangement produces, as a whole, a different total resistance.

The different total resistances are automatically connected respectively in the common shunt field energizing circuit to successively decrease the field current and increase the speeds of all of the motors, as the switch is moved to the medium and high positions; and delay is automatically interposed on going from low to medium or from medium to high.

The field energization, and the motor speed can be changed similarly upon going back from high to medium or to low by manual setting of the speed selector switch.

When the speed selector switch was cut into the control as referred to, at the attainment of "low" speed, the speed selector switch may then be in the medium or high position, left there from a previous operation; in which case the speed will at once go up automatically to the higher speed without manipulation by the operator.

Changing the value of a resistance common to all of the shunt fields in this manner, is, in effect, changing the potential applied to the fields, so that while the speed of the motors can in general be increased or decreased, it does not interfere with the action of the dancer rolls, in giving each motor a different actual speed from that of the others.

Braking and stopping of all of the motors is effected automatically by dynamic braking at any time, during any phase of operation.

To initiate dynamic braking, the operator moves the safety switch to "stop" position.

Dynamic braking is effected in two steps automatically as follows.

On the first step, the speed selector switch is rendered ineffective; whereby the fields are energized as on low speed that is, full strength.

If the armature accelerating resistance had previously been cut out, one section is cut back in.

The supply of main current to the armatures and series fields is continued. The shunt fields are energized across the supply line, through the dancer roll rheostats. The loops around the armatures are closed through the common loop resistance; and dynamic braking begins.

The other sections of armature accelerating resistance are cut back in successively. This concludes the first step of braking, and the second step automatically takes place as follows:

As the motors slow down, the falling counter E.M.F. of one of them, preferably the last one of the succession, automatically causes the motor armatures and series fields to be disconnected from the line, when the counter E.M.F. reaches a preselected adjustable value. Also, the dancer roll rheostats are automatically short-circuited thereby raising the shunt field excitation to the maximum possible value. Braking then brings the motors to rest.

After a timed interval the whole control is then automatically returned to the "make ready" condition first referred to above.

The control comprises means by which, during the threading of the wire through the successive dies, and taking turns thereof on successive capstans, individual capstans can be speeded up to save time on this operation. This is done by pedal operated controls that momentarily intermittently introduce a shunt field weakening resistor into the field circuit of the motor driving the subject capstan.

When, as is sometimes the case, a motor driven air blower is utilized to cool the dies, motors, etc., the blower motor has a control circuit interlocked with the main control so that the main control cannot be operated to energize the motors unless the blower is operating.

Provision is made so that when the supply of wire to the dies becomes exhausted, the machine will automatically stop. This is done by a limit switch operated by one of the dancer roll rheostat arms, upon its automatic spring-return from the zone of movement in which it is operated by the wire.

An object of the invention is to provide generally an improved control and an improved mode of operation thereof, for a wire drawing machine of the class referred to.

Another object is to provide a control system for a wire drawing machine of the class referred to, comprising some or all of the features of improvement mentioned in the foregoing.

Another object is to provide a control system for a wire drawing machine of the class referred to, some or all of the parts of which have the improved mode of operation described in the foregoing.

Other objects will occur to those skilled in the art to which the invention appertains.

The actual invention is that set forth in the appended claims.

An illustrative embodiment of the invention is fully disclosed in the following description taken in connection with the accompanying drawing in which:

Fig. 1 is a diagrammatic view, as referred to hereinbefore illustrating the main elements of a motor-driven wire-drawing machine with incomplete electric circuits for the motors thereof;

Fig. 2 is a diagrammatic view illustrating the complete circuits of the motors of Fig. 1; and contacts and contactors controlling them;

Fig. 3 and Fig. 3A taken together constitute a diagrammatic view of a control system for the contacts and contactors of Fig. 2;

Fig. 4 is a diagrammatic view of a blower motor control which may be used with the control of Figs. 3–3A.

In the several figures, to simplify the drawing, contactors are shown complete as having all of their contacts associated with them, some open and some closed as indicated, but without circuit connections thereto; and each of these contacts is reproduced elsewhere with the complete circuit connections thereto.

In Fig. 2 the contactors and their contacts are as follows:

Overload contactors 10L to 60L having respectively normally closed contacts 10L.1 to 60L.1;

A contactor VR having normally open contacts VR.1.

Also in Fig. 2, the motor armatures, series fields, shunt fields, dancer rolls and resistors are shown with the same reference characters as in Fig. 1.

Resistance sections which may be referred to as armature accelerating resistors are shown at 44 to 48; and resistors which may be referred to as shunt field accelerating resistors are shown at 49 to 51.

In Fig. 3 the contactors and their contacts are as follows:

A contactor J1 with five contacts normally open and two normally closed; numbered from J1.1 to J1.7;

A contactor J2 with three contacts normally open and one normally closed; numbered J2.1 to J2.4;

A contactor R1 with four contacts normally open and two normally closed; numbered R1.1 to R1.6;

A contactor R2 with five contacts normally open and two normally closed; numbered R2.1 to R2.7;

A group of contactors 2W, 3W, 4W, 5W each with two contacts normally closed, for example, 2W.1 and 2W.2;

A timing contactor 1T having two normally closed contacts 1T.1, 1T.2;

A contactor M having one normally closed contact M.1 and one normally open M.2;

A contactor 1S having two normally open contacts, 1S.1 and 1S.2, and one normally closed contact 1S.3;

A contactor 2S having three normally open contacts 2S.1 and 2S.3;

A contactor DB having one normally open contact DB.1 and one normally closed contact DB.2;

A contactor DBR having three normally open and two normally closed contacts numbered DBR.1 to DBR.5;

A contactor 1FF having three normally open contacts 1FF.1 to 1FF.3;

A contactor 2FF having three normally open contacts 2FF.1 and 2FF.3.

In Fig. 3A the contactors and contacts are:

A contactor VCR having one normally open contact and two normally closed contacts numbered VCR.1 to VCR.3;

A contactor 1A having two normally open and one normally closed contacts numbered 1A.1 to 1A.3;

A timing contactor 2T, having one normally open contact 2T.1;

A contactor 2A having two normally open contacts 2A.1 and 2A.2;

A contactor 3A having two normally open contacts 3A.1 and 3A.2;

A contactor 4A having two normally open contacts 4A.1 and 4A.2;

A timing contactor 5AT having two normally open contacts 5AT.1 and 5AT.2, and two normally closed, 5AT.3 and 5AT.4;

A contactor 5A having two normally open and one normally closed contact, 5A.1 to 5A.3;

A contactor F1A having normally open and normally closed contacts F1A.1 and F1A.2;

A contactor FCR having two normally open contacts FCR.1 and FCR.2 and one normally closed FCR.3;

A contactor F2A having two normally open contacts F2A.1 and F2A.2 and one normally closed F2A.3;

A timing contactor 3T, having one normally open contact 3T.1.

In Figs. 3–3A the contactors 1T, 1A, 2T, 2A, 3A, 4A, 5AT, FCR, F2A and 3T are delayed operation contactors as indicated by a symbolized dash-pot in each case.

At JMS, top of Fig. 3 is a "jog master switch" normally held open as indicated by a spring 58, and constructed to be closed by the operator by pressing on a foot rail 59 extending along the front of the machine.

At RSS is a "run-safety-switch" or controller, shown diagrammatically as comprising six stationary conntacts 60 to 65; and a contact bridging bar 66, carried by a controller element, proper 67.

The element 67 is shown in a middle or "run" position to which it normally is returned by springs 68—69 and from which an operator may pull it toward himself to a forward "start" position by pulling upon a rail 70 extending along the front of the machine, or push it away to a rearward or "stop" position by pushing on the rail 70.

At the middle or run position the bridging bar 66 connects contacts 60—61 and 62—63 together in pairs.

At the forward or start position the bar 66 connects all of the contacts together in pairs, 60—61, 64—65, and 62—63.

At the rearward or start position the bar 66 is disconnected from all of the contacts 60 to 65.

A controller operated by a front rail as referred to here embodies safety to the operator. In the event that he should fall forwardly on the machine, his body would push on the rail 70 and move the safety switch to the "stop" position, and, as will appear later, that will very quickly stop the machine.

In Fig. 3 at 2P to 5P are four switches to be operated by foot pressure in the nature of push buttons, one corresponding to each of the motors except the first and the last, that is, motors 2—3—4—5 for a purpose to be described.

Also in Fig. 3A at SSS is a speed selector switch having three speed positions; low, medium and high, designated L, M and H.

In Fig. 4 is a contactor BM having three main line contacts normally open (not numbered) and two normally open contacts BM.1 and BM.2.

Other parts and connections in the system, not described above, will be described during the description of operation which follows.

*Make ready conditions*

Mention has been made of the importance of always starting the motors by going first into and through a jogging phase, and with strong motor shunt fields to insure slow speed; and accordingly the system makes ready for operation by making the fields strong before anything else can be done.

In Fig. 2, mains 71—72 supply D.C. potential to disconnect switches 73—74 for the main motor system; and the potential is communicated by wires 75—76 to disconnect switches 77—78 at the control part of the system, Figs. 3–3A. When the disconnect switches are all closed, control means 79—80 of Figs. 3–3A are energized.

It will be noted that in Fig. 2, the motor armatures 1 to 6 and series fields 7 to 12 get no current at this time because contacts M.2 (near the disconnect switch 73) are open.

Figs. 3–3A will be recognized as an across-the-line type of diagram; and it has several circuit lines there-across, numbered for reference 81 to 109. At this time all of these lines are open, because of open contactor contacts, except the following, which energize contactors 1T, 1FF, 2FF, and 5AT.

In line 86, ccurrent through closed contacts J1.6 and R2.6 energizes contactor 1T and it operates with a time interval, finally opening its contacts 1T.1 and 1T.2.

In line 94, current through closed contacts M.1 energize contacts 1FF and 2FF in parallel and they both operate and close all of their contacts 1FF.1 to 1FF.3 and 2FF.1 to 2FF.3 with a resistor 110 in parallel with their windings.

In line 104, contacts J2.4, R2.7 and VCR.3 are all closed and current flows through them and energizes contactor 5AT, and it starts to run its time interval, and during that time, in line 108, contacts 5AT.4 keep closed a circuit to line 106 thence through contacts FCR.3 energizing contactor F1A and it operates closing contacts F1A.1.

In Fig. 2, which is also an across the line type of diagram, there is a side line 111 coming directly from the disconnect switch 73; and another side line 112 coming from the disconnect switch 74 through now closed contacts F1A.1; and there are a number of cross lines numbered 113 to 118 for reference.

These cross lines contain the shunt fields 13 to 18, and contain contacts 1FF.1 to 1FF.3 and 2FF.1 to 2FF.3 which have closed as just described; so that the shunt fields 13 to 18 are all fully energized directly across the supply mains between lines 111 and 112.

Provision is made to prevent overheating the shunt field windings if they are kept across the line for an indefinite time, by contactor 5AT. When it runs its timed period, it opens its contacts 5AT.4 in line 108 Fig. 3A deenergizing contactor F1A, causing its contact F1A.1 in Fig. 2 to open and insert into the side line 112 by way of line 132 and contacts F2A.3, a section 51 of resistance.

Jogging operation

This description of jogging presupposes that the machine has already been "threaded" with wire, as for example from a previous full running operation. "Threading" will be described later.

With the shunt fields thus energized across the line to full strength when line potential was put on the system, the operator depresses the jog switch JMS, Fig. 3. The safety switch RSS is normally in the run position as referred to. Current then flows from side line 79 at one side of the safety switch RSS over the following circuit: contact 60 to contact 61, cross line 81, upper contacts of a snarl switch 119, the contacts 10L.1 to 60L.1 of six overload contactors (the contactors 10L to 60L themselves being in Fig. 2 as referred to); closed contacts VCR.2 and 5A.3, the contacts of the jog switch JMS itself, back by wire 82, through the windings of contactors J1 and J2, by cross line 83 to contacts 62—63 of the safety switch RSS, by cross line 83A and lower contacts of the snarl switch 119 to the side line 80.

The contactors J1—J2 operate closing contacts J1.1 to J1.5 and opening contacts J1.6 and J1.7; and closing contacts J2.1 to J2.3 and opening contacts J2.4.

In cross line 86 opening of contacts J1.6 deenergizes timing contact 1T and it restores closing its contacts 1T.1 and 1T.2.

In cross line 87 (upon closing of contacts 1T.1, contacts J1.3 being closed) current flows from side line 79 to side line 80 energizing contactor M and it opens contacts M.1 and closes contacts M.2.

In cross line 94, opening of contacts M.1 deenergizes contactors 1FF and 2FF and they restore opening all of their contacts 1FF.1 to 1FF.3 and 2FF.1 to 2FF.3.

In cross line 90 closing of contacts 1T.2 energizes contactors 1S and 2S and they operate closing their contacts 1S.1, 1S.2, 2S.1, 2S.2 and 2S.3.

In cross line 104, Fig. 3A, opening of contacts J2.4 deenergizes contactor 5AT and it restores opening contacts 5AT.1 and 5AT.2 and closing contacts 5AT.3 and 5AT.4.

In cross line 108 closing of contacts 5AT.4 and by cross line 106 (contacts FCR.3 being closed), contactor F1A is operated closing contacts F1A.1 and opening contacts F1A.2.

The results of these contactor operations by the jog switch JMS are as follows:

In Fig. 2 there are two vertical bus bars 121—122, across which are connected six cross lines 123 to 128, each containing, in series, an overload contactor, a motor series field, and its armature, for example, 10L, 7 and 1, for the cross line 123.

There is a third vertical bus bar 129, and the said contactors 1S and 2S have their contacts 2S.1 to 2S.3 and 1S.1 to 1S.2 connected respectively between the bus bars 129 and points in the cross lines 123 to 127 between the motor armatures and their series fields.

The top of bus bar 121 is connected to the main line 71 through contacts M.2 now closed.

The top of the bus bar 122 is connected to the top of the bus bar 129 through the resistance section 43, and through closed contacts DB.2; and the top of bus bar 122 is also connected through the armature resistance sections 44 to 48, to the other line 72.

Upon operation of the contactors of Fig. 3, as above described, by depression of the jog switch JMS, motor current from line 71 flows through closed contacts M.2; and down through the bus bar 121, and through all of the six series motors in parallel and up through the bus bar 122 and through all of the resistance sections 44 to 48 to the line 72.

Also, by means of the closed contacts 2S.1 to 2S.3; 1S.1; and 1S.2; parallel loops are closed around each of the motor armatures 1 to 5, comprising parts of the bus bar 122, the resistor 43, contacts DB.2, now closed, and parts of the bus bar 129. The resistor 43 is seen to be common to all of the loops. The motor 6 has at all times a loop across its armature through the common resistor 43 by way of bus bars 122 and 129.

The shunt fields 13 to 18 are at maximum possible strength being energized directly across the side lines 111 and 112, contacts F1A.1 in side line 112 being now closed; and contacts 1FF.1 to 1FF.3 and 2FF.1 to 2FF.3 being closed.

Thus the motors all start under conditions of full shunt field strength; but with weak armature current due to the loops around the armatures; and the starting torque is therefore small; and is thus provided for and utilized as "take up" torque to gently take up slack that may be present in the wire threaded in the dies.

This "take up" torque is timed to exist for only a short time interval, by the timing contactor 2T which (in cross line 97, Fig. 3A) was energized and started its interval when contacts J1.4 closed; and at the end of its interval it closes contacts 2T.1.

In Fig. 3, line 92, when contacts 2T.1 close, and contacts J2.2 and DBR.4 being closed, contactor DB is energized and closes contacts DB.1 and opens contacts DB.2.

In Fig. 2, contacts DB.2 upon opening, open the connection between bus bars 122—129 at the resistor 43 and thereby open all of the said motor armature loops.

In Fig. 3, line 92, and 92A, closing of contacts DB.1 energizes contactor DBR and it operates, closing contacts DBR.1 to DBR.3 and opening contacts DBR.4 and DBR.5.

In Fig. 3, line 90, opening of contacts DBR.5 deenergizes contactors 1S and 2S and they open their contacts 1S.1; 1S.2; 2S.1; 2S.2; 2S.3 and close contacts 1S.3.

In Fig. 2, opening of contacts 2S.1 to 2S.3 and 1S.1 and 1S.2; opens all of the individual motor armature loops.

Thus after a short time interval of small slack "take up" torque, the loops around the armatures are opened, providing increased armature current, which, together with the series fields and the strong shunt fields, produces a high torque. This is utilized as "break away" torque on all the motors to start the wire through the dies. The motors then run at low jogging speed.

As to said contactors 1FF and 2FF of Fig. 2 whose closed contacts 1FF.1 etc. and 2FF.1 etc. up to this time have kept a short circuit on the resistors 32 to 37 for the sake of maximum shunt field energization; their windings in Fig. 3 are in parallel with the resistor 110 as described. Therefore, when the line 94 in Fig. 3 is opened at the contacts M.1, as described, their windings are deenergized, but, they do not immediately restore. By discharging through the resistor 110, they are maintained operated for a short interval, and then restore, opening their contacts.

This interval is long enough to maintain the maximum field energization through their contacts long enough to provide the said "break away" torque at high value; and start movement of the wire through the dies.

When the contactors 1FF and 2FF restore a short time later, at the end of said time interval then, in Fig. 2, the contacts 1FF.1 to 1FF.3 and 2FF.1 to 2FF.3 open, and the dancer roll resistors 32 to 36 are brought into the respective circuits of the fields 13 to 17 and begin their function of keeping slack out of the wire between dies, and the resistor 37 is put into the circuit of the last field 18 for manual speed regulating purposes; but otherwise the shunt fields are across the line, since contacts F1A.1 are closed. The motors are therefore in general running at very low jogging speed.

After another time interval the motors are finally speeded up to full jogging speed, this time interval being interposed to allow the action to become stabilized; and this is done by the timer 1A as follows:

In Fig. 3A, line 96, closing of contacts DBR.2 energizes contactor 1A and it operates closing contacts 1A.1 and 1A.3 and opening contacts 1A.3.

In Fig. 2, closing of contacts 1A.1 cuts out one step 44 of armature accelerating resistance common to all of the motors.

The motors are all now running as conventional compound motors subject to control of their relative speeds by the dancer roll resistors 32 to 36; but with the armature resistance sections 45 to 48 in series therewith.

This brings the speed of operation of the machine as a whole up to its full jogging speed, which is still a very low speed, and operation of the machine can be inspected before speeding it up to running speed.

*Running speed operation*

To operate the machine at running speed it must first be brought up to the jogging speed as just described.

In Fig. 3, the operator while still holding the jog switch JMS closed, pulls the rail 70 of the safety switch RSS forwardly to Start position, thereby bridging contacts 64—65.

Current then operates the run contactors R1 and R2, the current going from side line 79 by bridged contacts 60—61, and line 81 as before to the line 82, thence by contacts 64—65 to line 84 through contacts J1.2 which are still closed and continuing by line 84 to the windings of the contactors R1—R2 and thence by line 83 and bridged contacts 62—63 to line 83A and to side line 80; the contactors closing contacts R1.1 to R1.3 and R1.6 and contacts R2.1 to R2.5; and opening contacts R1.4 and R1.5 and contacts R2.6 and R2.7.

When the contactors R1—R2 have thus operated, the operator releases the jog switch JMS, whereupon its contacts open and deenergize contactors J1 and J2 and they restore and restore all of their contacts; and the operator then releases the rail 70 at the safety switch RSS and it goes to Run position.

In Fig. 3 just above the contactors R1—R2, there are three contacts, namely, R1.1 now closed and LS normally spring-closed, and BM.2 to be closed as described later; and here it will be assumed that they are all closed.

After the jog switch JMS is opened as referred to, and the safety switch RSS is returned to Run position, the contactors R1 and R2 are maintained operated by current in line 84A, through the contacts BM.2, LS, R1.1, to line 84, through the windings of contactors R1 and R2, left through line 83, through bridged contacts 62—63 by line 83A to the side line 80.

In Fig. 3, upon the restoring of the jog contactors J1—J2 and operation of the run contactors R1—R2 the effects on the cross lines are as follows:

In line 86, contacts R2.6 open and contactor 1T is not energized and its contacts 1T.1 and 1T.2 are closed.

In line 88, contacts R1.2 close and together with closed contacts 1T.1 keep contactor M operated and keep contacts M.2 closed in Fig. 2.

In line 90, contacts DBR.5 are open, see below, so that contactors 1S and 2S are deenergized and contacts 2S.1 to 2S.3 and 1S.1 and 1S.2 in Fig. 2 remain open.

In line 93, contacts DBR.1, and R2.1 are closed and contactor DB remains operated and in Fig. 2 keeps contacts DB.2 open.

In line 93, contacts DBR.1, R2.1 and DB.1 maintain contactor DBR operated.

In line 94, contacts M.1 are open and keep contactors 1FF and 2FF restored so that in Fig. 2, contacts 1FF.1 to 1FF.3 and 2FF.1 to 2FF.3 remain open.

In line 96 Fig. 3A contacts DBR.2 and 5AT.3 are colsed and contactor 1A is maintained operated.

In line 98 contacts 1A.3 are open and contactor 2T is restored.

Automatic acceleration of the motors now takes place by cutting out the armature accelerating resistance sections 45 to 48 in Fig. 2 by contacts 2A.1, 3A.1, 4A.1 and 5A.1, as follows, section 44 being already cut out by contacts 1A.1 at the end of jogging.

In line 99, Fig. 3A, contacts 1A.1 and DBR.3 being closed, as soon as contacts R2.3 on the run switch R2 close, contactor 2A operates closing contacts 2A.1 and cutting out resistance section 45, and closing contacts 2A.2.

In line 101, contacts 2A.2 energize contactor 3A and it cuts out section 46 on contacts 3A.1 and closes 3A.2.

In line 102 contacts 3A.2 energize contactor 4A and it cuts out section 47 on contacts 4A.1 and closes 4A.2.

In line 103 contacts 4A.2 close and energize contactor 5AT and it closes contacts 5AT.1 and 5AT.2 and opens contacts 5AT.3 and 5AT.4.

In line 105, contacts R2.5 being closed, contacts 5AT.2 on closing energize contactor 5A and it closes contacts 5A.1 and 5A.2 and opens contacts 5A.3; and in Fig. 2, contacts 5A.1 cut out section 48 and short circuit all of the sections 44 to 48.

In line 96, contacts 5AT.3 open, and deenergize contactor 1A; and the latter by its contacts 1A.2 in line 99 deenergizes contactor 2A; and the latter by its contacts 2A.2 in line 101 deenergizes contactor 3A; and the latter by its contacts 3A.2 in line 102 deenergizes contactor 4A. The latter by its contacts 4A.2 in line 103 does not deenergize contactor 5AT because it is held energized by contacts R2.4 and 5AT.1 in line 100; and contacts 5AT.2 and closed contacts R2.5 in line 105 hold contactor 5A operated.

Thus contactors 1A, 2A, 3A, 4A are deenergized, and in Fig. 2 their contacts 1A.1; 2A.1; 3A.1, 4A.1; all open, but contacts 5A.1 remain closed keeping the resistance sections 44 to 48 cut out.

The automatic acceleration is now complete.

Conatcts F1A.1 in Fig. 2 remain closed because in Fig. 3 contactor F1A remains energized through line 106 and contacts R1.3 in line 107, although contacts 5AT.4 are open.

The motor shunt fields thus have full strength across the line, except for control by the dancer rolls of resistors 32 to 36; and this determines the minimum or low running speed of the machine.

Higher speeds are optionally obtained as follows by manual control.

In line 109, contacts 5A.2 are closed as described and they connect a speed changing network in line 109 across the side lines 79—80. This network comprises contactors FCR—F2A and 3T and the manual speed selector switch SSS, having said three speed positions, L-M-H.

With the switch SSS set for low speed L, all of these contactors are un-energized, contactor FCR being unenergized because contactor F1A is energized as described and contacts F1A.2 are open; and the corresponding low speed of the motors is that above referred to as the minimum speed.

Upon moving the speed selector switch SSS to medium speed position, M, a circuit is closed through network line 130 energizing contactor FCR and closing its contacts FCR.1 and FCR.2; and opening FCR.3.

In line 106 Fig. 3, opening of contacts FCR.3 deenergizes contactor F1A and in Fig. 2 its contacts F1A.1 open; also contacts FCR.1 in Fig. 2 are now closed.

At low speed in Fig. 2 contacts F1A.1 alone were closed. Now in Fig. 2 contacts F1A.1 and F2A.2 are open and F2A.3 and FCR.1 are closed.

The field resistors 49—50—51 are thereby put in a different arrangement in the field circuit, namely; all of the sections 51—50—49 are connected from side line 112 through contacts FCR.1 and by a wire 131 to side line 111, providing a resistance shunt around the fields; and current from the fields in line 112 flows by wire 132 through contacts F2A.3 and through resistance section 51.

The fields are thus weakened and the motors then run at medium speed.

If the speed selector switch SSS is moved to the high speed position, H, a network circuit is again made in line 130, and contactor FCR is maintained energized and in Fig. 2 contacts FCR.1 are maintained closed and contacts F1A.1 maintained open, as described; but in the network Fig. 3 a circuit is made by wire 133 through closed contacts FCR.2 energizing a timing contactor 3T, which, when it runs its interval, closes contacts 3T.1.

Contacts 3T.1 in line 134, on closing, energize contactor F2A, closing contacts F2A.1 and F2A.2 and opening contacts F2A.3.

In the network, contacts F2A.1 on closing make a holding circuit for contactor F2A.

In Fig. 2, therefore, contacts FCR.1 and F2A.2 are closed, and F2A.3 open and F1A.1 open, and another arrangement of the sections 49, 50, 51 results, giving the fields still less current and the motors a correspondingly high speed.

These speeds can at anytime be adjusted back from high to medium or to low, by the speed selector switch SSS as will be apparent.

It will be understood that all of the motors will, in general, run at these speeds, low, medium and high but that one motor may have a speed a little different from another due to the dancer roll rheostats.

For a given potential between the side lines 111—112, Fig. 2, to which the fields are subjected, the speed of motor 6 is adjustable within a range by the manual rheostat 37 Fig. 2. The speeds of the other motors then automatically adjust themselves to approximately the same speed through the action of the dancer rolls and their rheostats.

The resistors 49—50—51 are connected in different series parallel arrangements, or all short circuited, by different positions of the speed selector switch SSS as described and cause the side lines 111—112 to be subjected to different potentials.

The speeds low, medium and high set by the speed selector switch are therefore three ranges of speed within which the motors may be caused to run.

*Dynamic braking*

When it is desired to stop the machine, it is stopped by dynamic braking in a short interval of time.

It is stopped by this means, whether it is running at jogging speed with the jog switch JMS held down and the jogging relays J1 and J2 operated, or whether it is running at running speed, low, medium or high as selected by the speed selector switch SSS, or whether it is in process of acceleration toward running speed with the safety switch RSS on start or on run position.

This introduces an over-all safety feature.

Such stopping is effected in two steps, if the motors are at running speed, and is effected in one step if the motors are at jogging speed.

On the first step the motor armatures and series fields are kept connected across the power lines by the contacts M.2; and the armature resistance sections and resistances 44 to 48 that have been cut out are cut back into the armature circuit; and the armature loops are closed around each armature by the contacts of contactors S1 and S2 with the common resistor 43 cut into these loops by the contacts DB.2. The speed selector switch SSS and the speed changing network of Fig. 3A is also cut out, and the motor shunt fields are made strong by closing contacts F1A.1 in Fig. 2.

These conditions are brought about as follows:

To initiate stopping, the operator has only one thing to do, which contributes to safety, when stopping is wanted.

In Fig. 3 he pushes the hand rail 70 of the safety switch RSS back to the stop position.

If the jog switch MS is closed or open, and if either the jog contactors J1—J2 or the run contactors R1—R2 happen to be in operated condition, they are immediately restored because their energizing circuits are opened on the contacts 60—61 and 62—63 of the safety switch.

In Fig. 3, line 86, contacts J1.6 and R2.6 both being closed the timer 1T is energized and starts a time interval but it is timed to remain unoperated until after the motors have stopped, to be referred to.

In line 95 Fig. 3A are contacts VR.1. These contacts are on a contactor VR at the bottom of Fig. 2 whose winding is connected across the armature 6 through a resistor 57; and during jogging the resistor was shorted by contacts J1.5 on the jog contacts J1 so that the contactor VR was then operated, and closed contacts VR.1 in line 95. Now that the contactor J1 is restored as above described, the contactor VR is held operated by the counter E.M.F. of the motor armature 6 at adjustably reduced impressed voltage due to the voltage drop in resistor 57.

In line 95 the contacts VR.1 being closed, contactor VCR is operated and contacts VCR.1 are closed.

In line 89 these contacts provide a holding circuit through contacts 1T.1 for the contactor M, so that its contacts M.2 in Fig. 2 are maintained closed, connecting the series fields and armatures of the six motors to the main lines.

In line 91, contacts R1.5 and J1.7 being closed, contactors 1S and 2S are energized through contacts 1T.2 and in Fig. 2 the contacts 2S.1 to 2S.3 and 1S.1 to S1.2 close, partly completing the aforesaid loops around the armatures.

Also in line 92 contacts J2.2 and R2.1 and 1S.3 are all open now, and contactors DB and DBR are deenergized and restore.

Restoring of contactor DB closes contacts DB.2 in Fig. 2 and completes the loop circuits of the armatures through the resistor 43.

In line 105 Fig. 3-A, contacts R2.5 opened when the run contactor R2 was first restored on going to "stop" as referred to, and deenergized contactor 5A; and in line 109 its contacts 5A.2 opened and cut off the network of line 109—109 restoring contactors FCR and F2A; and in Fig. 2 its contacts 5A.1 opened and cut back into the armature circuit the resistor 48.

The restoring of contactors FCR and F2A opened contacts FCR.1 and F2A.2, and closed contacts F2A.3 in Fig. 2, giving a combination of the resistors 49—50—51, as referred to above, of low value and corresponding high energization of the shunt fields.

Restoring of contactor DBR opens contacts DBR.2 in line 96, restoring contactor 1A and opening contacts 1A.1; and in line 99, opening of contacts DBR.3 or contacts 1A.2 restores contactor 2A and opens its contacts 2A.1; and in line 101 opening of contacts 2A.2 restores contactor 3A and opens its contacts 3A.1 and 3A.2; and in line 102 opening of contacts 3A.2 restores contactor 4A and opens its contacts 4A.1.

The opening of contacts 1A.1; 2A.1; 3A.1; 4A.1; reinserts the armature resistance sections 44 to 47 into the circuit of the series fields and armatures across the line; section 48 being earlier reinserted as described.

When contactor 4A was restored, then in line 103, contacts 4A.2 opened and contacts VCR.3 in line 104 being open, contactor 5AT was deenergized and restored closing contacts 5AT.4 in line 108; and in line 106 contacts RCR.3 being closed upon restoring of contactor FCR as described, contactor F1A was energized and operated closing contacts F1A.1 in Fig. 2 giving full potential to the shunt fields.

Thus dynamic braking on the first step begins under the foregoing conditions for each motor namely; a loop across the armature containing resistor 43; a series path across the line voltage consisting of: the series field; the armature and its loop; and the accelerating resistance sections 44 to 48. The shunt field is of full strength, subject to regulation by the dancer roll. The braking action is as follows.

When said conditions are first established, the motor C.E.M.F. opposes the line voltage, and a large part of the line voltage drop is across the armature, the remainder causes current in the series field and the resistance sections.

Dynamic braking of the motor by its loop circuit begins and the motor slows down.

As it slows down, its C.E.M.F. reduces and the line voltage drop across it reduces, and, accordingly the current flowing in the series field and resistance sections increases.

Dynamic braking by the armature loop tends to decrease as the motor slows down, but tends to be maintained by the increasing series field strength; with improved dynamic braking effect.

During this braking action, current coming from the line to the armature which might cause the motor to "motorize" if it went through the armature, is shunted around the armature into the armature loop; and this will go on so long as decreasing armature speed is greater than some predetermined speed at which the C.E.M.F. of the armature is equal to that part of the line voltage drop across it. Motorizing during this first step of braking is prevented by going to the second step of braking before the motors slows down to said predetermined speed.

The foregoing constitutes the first step of slowing down by dynamic braking.

As to the second step; in Fig. 2 the slowing down effected on the first step lowers the potential at the terminals of armature 6, and subjects the winding of contactor VR to falling voltage, and when it falls to a preselected value determined by adjustment of the resistor 57, which may for example be 100 volts, on a 230 volt supply, contactor VR restores opening contacts VR.1.

In Fig. 3, line 95, opening of contacts VR.1 restores contactor VCR, opening contactor VCR.1.

In line 89 opening of contact VCR.1 deenergizes contactor M and it restores open contacts M.2, and closing contacts M.1.

In Fig. 2 opening of contacts M.2 cuts off the power line from the motors.

In line 94 Fig. 3 closing of contacts M.2 energizes contactors 1FF and 2FF and they operate closing their contacts 1FF.1 to 1FF.3 and 2FF.1 to 2FF.3 which in Fig. 2 short circuit the speed regulating resistances 32 to 37 and give full strength to the shunt fields across the power line. The conditions thus established for each motion are: full strength shunt field; and the armature cut off from line voltage and in a closed dynamic braking loop. This brings the motors to rest; and constitutes the second step of braking.

The aforesaid first and second steps of dynamic braking are performed to stop the motors when operating at running speed.

When operating at jogging speed they can be more readily stopped, and the aforesaid second step is used alone for the purpose.

As described with the safety switch in stop position the conditions for said second step are established automatically when the speed of armature 6 falls so low that its C.E.M.F. is too low to hold contactor VR operated.

When running at jogging speed, the armature C.E.M.F. is always too low to hold contactor VR operated so that immediately upon moving the safety switch to stop position, the conditions are established for the second step braking.

In line 104 contacts VCR.3 closed upon the said restoring of contactor VCR and, contacts J2.4 and R2.7 being closed, contactor 5AT was energized and started a time interval the end of which occurred after the motors came to rest. When it operates it opens contacts 5AT.4 in line 108 which deenergizes contactor F1A, opening contacts F1A.1 in Fig. 2, and this inserts resistance section 51 in the field circuit thus restoring the original "make ready" conditions and prevents overheating of the field windings, otherwise on full line voltage, if this condition should obtain for a considerable time.

As extra insurance that the winding of contactor M will be deenergized and disconnect the motors from the line as described, full reliance cannot always be placed on the variable voltage responsive contactors of the type of VR and VCR. Therefore the retarded contactor 1T was energized in Fig. 3, as referred to across the side lines 79—80 in line 86 as soon as the contacts J1.6 and R2.6 are restored. It is adjustably set so as not to operate until the motors have slowed down to a suitable speed. Also in line 90, when its contacts 1T.2 open, the windings of contactors 1S and 2S are deenergized to prevent overheating thereof if left energized.

*Cooling*

It is often desirable to have a motor driven blower, blowing upon the dies, the motors and machine generally to carry away heat.

To this end a blower operating circuit may be provided as shown in Fig. 4.

A main contactor BM having three main contacts as shown, is in the power line to the blower motor B. A manual starting circuit may be provided comprising the winding of the contactor BM connected across the power mains through a push button switch 136, with a holding circuit bridging the push button through contacts BM.1 on the contactor BM when it operates, and the blower may be stopped by a push button 137. However, the blower control is also interlocked with the control of Fig. 3 for the main motors, to insure that the blower will start automatically whenever the main motors are operated.

To this end, a normally open contact R1.6 is added to the contactor R1 of Fig. 3, and is reproduced in Fig. 4 and closes to operate the blower contactor BM whenever the run contactor R1 of Fig. 3 is operated.

Also contacts BM.2 in Fig. 4 are closed by the contactor BM whenever it operates to start the blower motor; and these are reproduced in Fig. 3 in cross line 84A.

This interlock operates as follows:

As described, the run contactor R1 operates initially when the jog switch JMS is operated, and remains operated when safety switch SSS is pulled forward to start position; the energizing circuit being through the jog switch, wire 82, contacts 64—65, wire 84, contacts J1.2, wire 84, winding of contactor R1, wire 83, contacts 62—63 and wire 83A.

In Fig. 4, contacts R1.6 are thereby closed, and energize the blower contactor BM to close its contacts BM.2.

When the jog switch is released contactor R1 is maintained operated by the circuit through wire 84A, including contacts R1.1, BM.2 both of which are now closed, and contacts LS normally spring closed.

By this arrangement the motors cannot be operated for jogging purpose without the blower.

On going to the run operations of the main motors, the run contactors R1—R2 must be operated, and, due to the program of operation prescribed for the jog switch JMS and the safety switch RSS, this cannot be done without putting the blower in operation.

When the safety switch RSS is moved to stop position and the run contactor R1 restores, opening contacts R1.6 in Fig. 4, the blower will continue to operate because the contactor BM is maintained through its own contacts BM.1 and this is desirable since stopping is done by dynamic braking and generates heat; but the blower can be shut down manually when no longer wanted by opening the contacts 137 which are in series with BM.1.

Limit switch

A limit switch is provided to stop the machine when the supply of wire being drawn is exhausted.

As referred to for Fig. 1 the wire 25 runs over the dancer rolls and holds them in clockwise position as seen in Fig. 1 against the tension of springs 140—140 tending to return them counterclockwise. When the supply of wire is exhausted, all of them one after the other will tend to so return.

One of them, when it so returns may be used to open contacts as shown diagrammatically in Fig. 2 in connection with the dancer roll 38 at the contacts LS; and these contacts are reproduced at LS in the line 84A as referred to.

As described, the run contactors R1—R2 must be retained operated to keep the main motors connected to the supply mains, so that upon opening of contacts LS, the machine shuts down.

Threading

Provision is made for independent control of the speed of motors 2 to 5 while threading wire through the dies, in order to save time on this operation.

With reference to Fig. 1, the operator will start up the machine with the motors running at low jogging speed and all at the same speed, since the dancer rolls will not be operating. He will then thread the wire through the first die 26 and around the first capstan 19 and over the first dancer roll 38 and through the second die 27, and around the second capstan 20.

It is now desirable to speed up the motor 2 driving the capstan 20 to rapidly accumulate slack in the wire to go around the dancer roll 39 and be fed through the die 28; and this speeding up of motor 2 is accomplished as follows:

In Fig. 2, in line with the shunt field 14 of the motor 2 is a resistor 52, normally bridged by closed contacts 2W.1 and 2W.2.

These contacts are reproduced from Fig. 3 where they appear as contacts of a contactor 2W energized in cross line 85 through a normally open depressible pedal switch 2P.

The operator closes the switch 2P which operates the contactor 2W and it opens the contacts 2W.1 and 2W.2 which in Fig. 2 open and insert the resistance 52 directly in the circuit of field 14 weakening the field and causing motor 2 to speed up intermittently or continuously but only so long as the pedal switch is depressed.

Similar provision is made for the same purpose for the motors 3—4—5 by contactors 3W, 4W, 5W, operated by pedal switches 3P, 4P, 5P, and having contacts 3W.1—3W.2 and 4W.1—4W.2 and 5W.1—5W.2 controlling resistors 53—54—55 respectively.

This speeding up of individual motors can only be done when low speed jogging is effected by jogging contactors J1 and J2; and cannot be done after regular running has been started; because of the normally open contacts J2.1 of the jogging contactors, and normally closed contacts R1.4 of the run contactors, in line 85 Fig. 3 which control the current to the contactors 2W to 5W.

Speed adjustment

As referred to the speed of the last motor, number 6, is made adjustable by the manually operated rheostat 37 Fig. 2, over the range of the rheostat; and the speed of the last motor dictates the speeds of the other motors, by the wire-tension-controlled, dancer-roll-operated shunt field rheostats.

Provision is made to increase or decrease the speed range of the rheostat 37 by a resistor 56 which can be shorted or unshorted by a manual switch 138.

The switch 138 is shown as of the push button type, and would preferably be one that stays in the closed or open position to which it is moved. By this means the speed of the motors can be adjusted to any desired speed in a high speed range or in a low speed range.

As described, the control system of Figs. 3-3A, starts the motors from rest and accelerates them and finally connects them across the supply mains and they then run at a speed hereinbefore designated as "low" running speed.

The actual value of this finally attained "low" running speed, will be determined by the aforesaid adjustment at the rheostat 37 of the last motor.

In some cases, depending upon the characteristics of the wire-drawing job in hand, it may be desirable to adjust the speed of the last motor to a low value, and after the motors have been accelerated and brought up to operating speed, to then raise the speed by adjusting the speed of the last motor to a higher value, to increase the production rate of the machine.

On the other hand, at the end of the acceleration by the control system, with the motors connected across the supply lines, the top speed at which the machine should be operated on a particular job may already have been attained; or it may be exceeded in which instance it may be expedient to adjust it to a lower value by the rheostat 37 of the last motor.

In any event when acceleration is completed, the contacts 5A.2 in cross line 109, cut in the speed selecting network of that line, and if it then appears that still higher speeds than the said "low" speed attained at the end of acceleration would increase the production rate without loss of efficiency or damage to the work or to the machine, still higher speeds designated as medium or as high are provided for in that network.

A very wide range of speed is therefore provided for by the control system as a whole, available to the operator, and adapted to the machine for its best operation in the several phases thereof and with respect to the wire material and the drawing capacity of the dies etc., beginning with an exceedingly low creeping speed but at high torque when the wire must be "broken away" in the dies, and started, and going up into a jogging speed, intermittent if wanted, but still a very low speed, in careful preparation for continuous production, and up to a "low" production speed by automatic acceleration; and thereafter up to the maximum permissible and practicable production speed by selection.

We claim:

1. In an electric control system for controlling the capstan driving motors of a multi-die wire-drawing machine of the class described; current supply mains; electromagnetic control apparatus energized by the mains for starting the motors from rest and accelerating them up to speed to operate the machine, and braking the motors to rest to stop the machine; the control apparatus comprising circuits that connect the respective motor shunt fields directly across the energized mains before the motors start from rest and after they come to rest; the control apparatus comprising electromagnetic timing contactor means actuated by the energized mains to start a time interval before the motors start from rest and when they come to rest; and contacts operated by the timing means for inserting resistance in series with all of the shunt fields at the end of the time interval if the motors have not in the mean time started from rest.

2. In an electric control system for controlling the plurality of motors driving the series of capstans that draw wire through a corresponding series of dies of a multi-die wire-drawing machine; and which motors have armatures and shunt fields; a source of current; control means for connecting the armatures and shunt fields to the source and with high energization of the shunt fields to cause the motors to drive the capstans at low speed during the threading of the wire initially through the successive dies and winding turns thereof on the successive capstans; and a control operable by an operator to reduce the energization of the field of a selected motor to drive its capstan at a higher speed for periods of time at will, to facilitate said initial threading operation.

3. In an electric control system for controlling the plurality of motors driving the series of capstans that draw wire through a corresponding series of dies of a multi-die wire-drawing machine; and which motors have armatures and shunt fields; a source of current; control means for connecting the armatures and shunt fields to the source and with high energizations of the shunt fields to cause the motors to drive the capstans at low speed during the threading of the wire initially through the successive dies and winding turns thereof on the successive capstans; and a control for causing a selected motor and its driven capstan to be driven at a higher speed for periods of time at the will of an operator to facilitate said threading operation, comprising an impedance and an operator-operable contactor for inserting it in the shunt field circuit of the selected motor to reduce the energization thereof.

4. An interlocking control between the control system controlling the motor that drives a machine, and the control system for the motor that drives a machine cooling apparatus; the interlocking control being operable to prevent operation of the machine by its motor without putting the cooling apparatus motor into operation and keeping it operated after the machine motor has been stopped, and comprising: a first magnetic contactor operable to energize the cooling apparatus motor from supply mains and having a winding in a circuit from the supply mains: a second magnetic contactor in the machine motor control systems which is in operated condition whenever the machine driving motor is running, and which has contacts closing the said winding circuit when it operates, to effect operation of the first contactor to start the cooling apparatus motor; and the winding circuit having contacts therein operated by operation of the first contactor, to close the circuit independently of the said contacts of the second magnetic contactor, to maintain the first contactor operated and the cooling apparatus motor running after stopping of the machine driving motors and restoring of the second contactor.

References Cited in the file of this patent

UNITED STATES PATENTS

| | | |
|---|---|---|
| 1,805,248 | King | May 12, 1931 |
| 2,179,319 | Binney et al. | Nov. 7, 1939 |
| 2,567,635 | Bundy | Sept. 11, 1951 |